June 27, 1972 C. R. BRIGHT 3,672,855
GLASS LENS EDGING APPARATUS

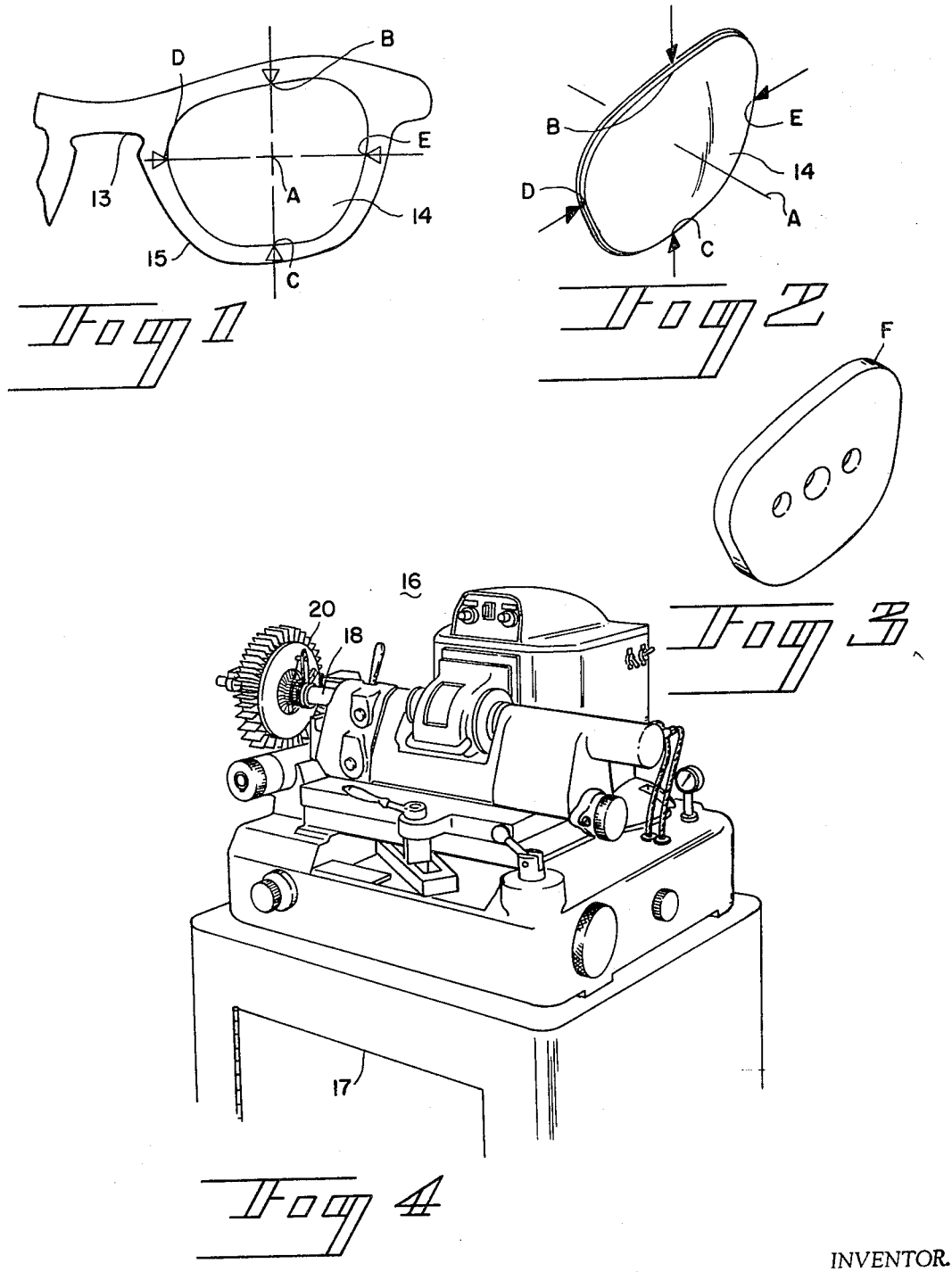

Filed Nov. 30, 1970 4 Sheets-Sheet 2

INVENTOR.
CHARLES R. BRIGHT
BY
ATTORNEY

June 27, 1972 C. R. BRIGHT 3,672,855
GLASS LENS EDGING APPARATUS
Filed Nov. 30, 1970 4 Sheets-Sheet 3
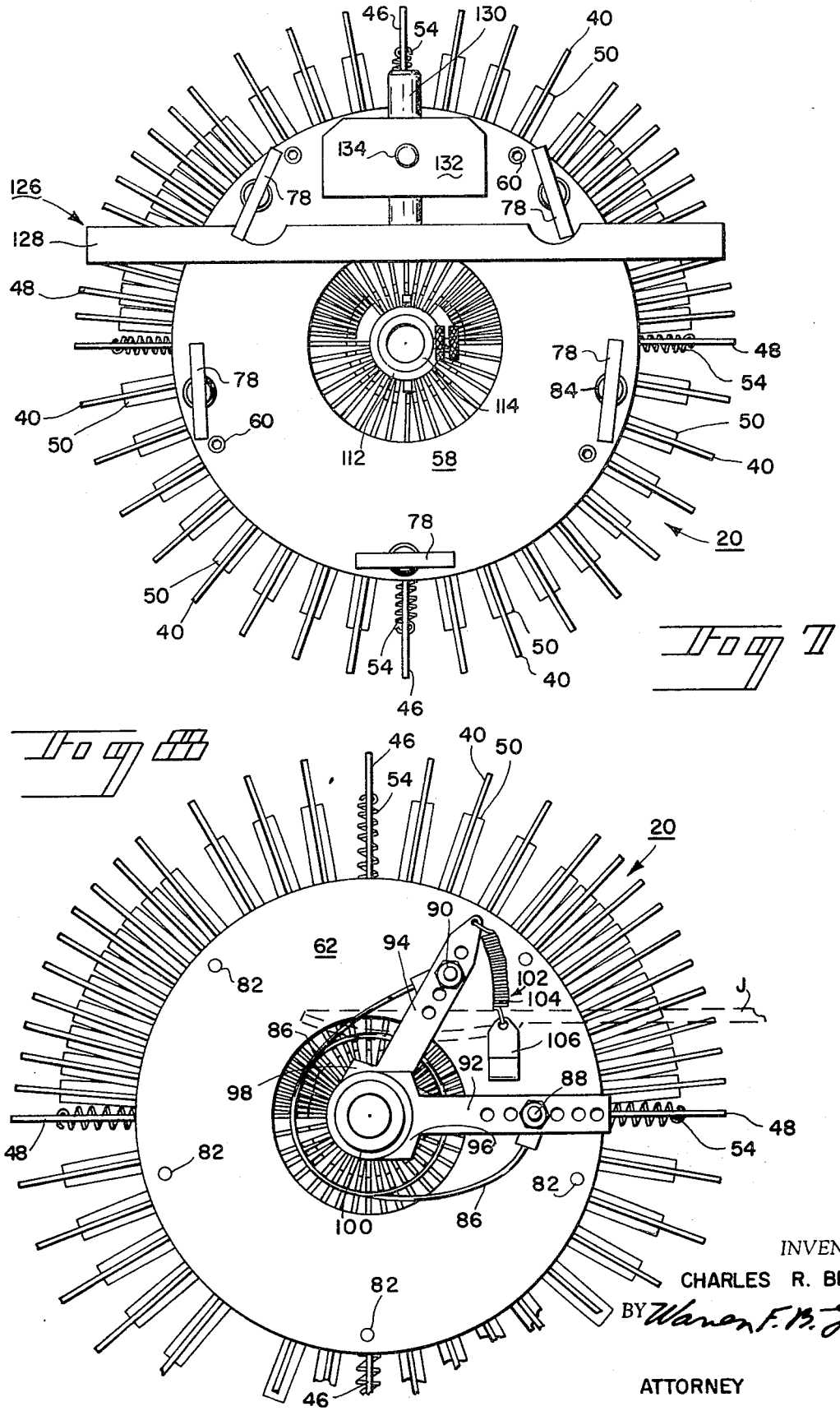

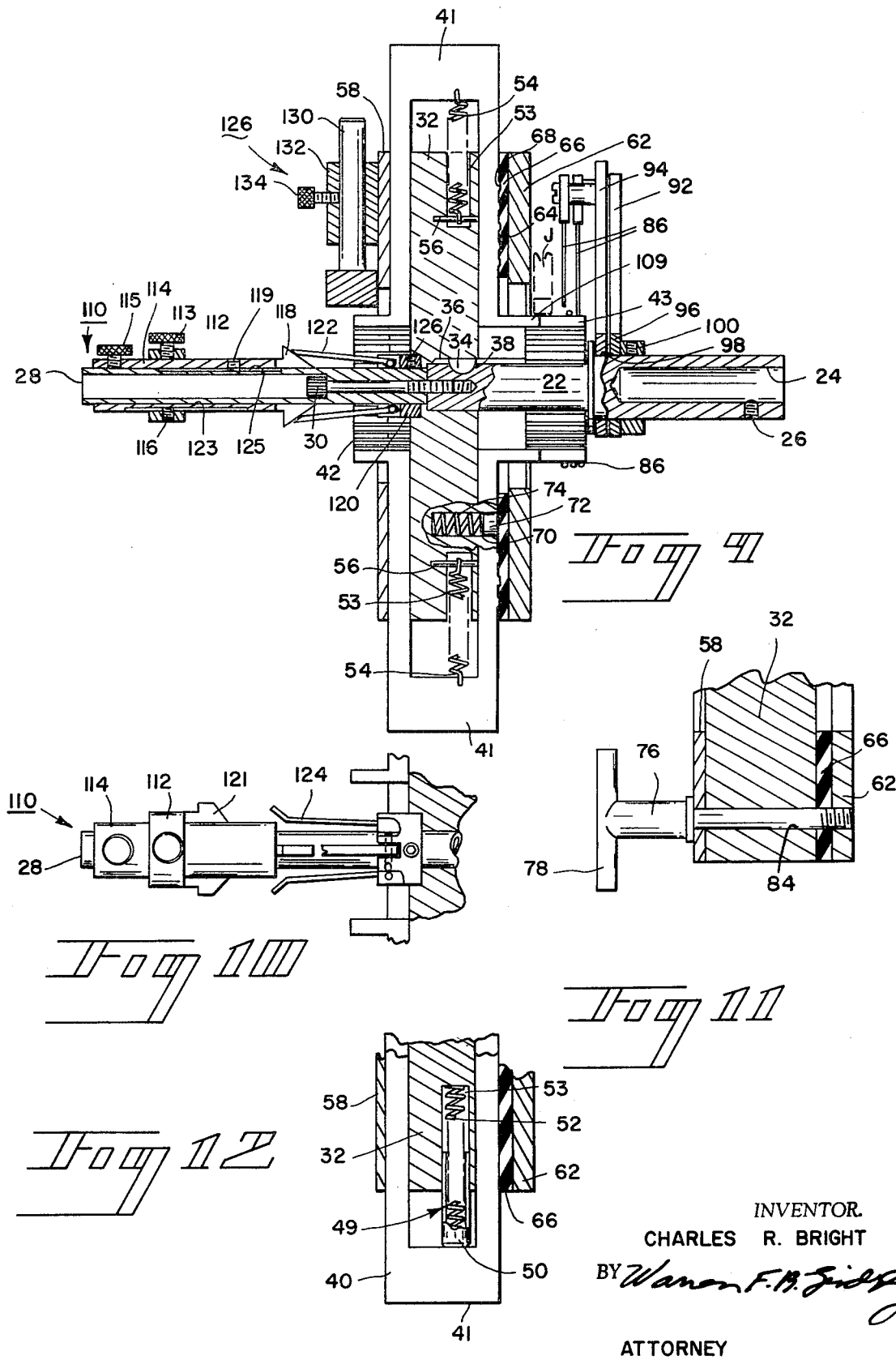

United States Patent Office 3,672,855
Patented June 27, 1972

3,672,855
GLASS LENS EDGING APPARATUS
Charles R. Bright, 8423 E. Hubbell,
Scottsdale, Ariz. 85257
Filed Nov. 30, 1970, Ser. No. 93,521
Int. Cl. B24b 9/08
U.S. Cl. 51—101 LG                    11 Claims

ABSTRACT OF THE DISCLOSURE

A glass lens edging apparatus which senses the inside periphery of the lens holding frame at a plurality of points and uses these sensor points for controlling lens forming equipment.

BACKGROUND OF THE INVENTION

This invention relates to lens forming equipment and more particularly to an improved glass lens shaping and sizing attachment for such equipment.

Field of the invention

This invention is directed to an attachment for eye glass bevel edging equipment which senses the frame for holding a particular lens thereby eliminating the need for patterns for each glass lens configuration.

Description of the prior art

Heretofore glass lens edging machines have sensed the edge of a preformed pattern for controlling the duplication of the lens edge in an eye glass lens edging machine. Each different lens configuration required a different pattern and the patterns or cam contours for each and every lens size or style had to be cataloged and stored for later reuse if the lens cost was to be kept reasonable.

SUMMARY OF THE INVENTION

In accordance with the invention claimed a new and improved attachment for eye glass bevel edging equipment is provided which eliminates cam shaped patterns presently used for sizing and shaping lenses to fit the eye glass frame.

Accordingly, it is one object of this invention to provide an improved lens frame sensing attachment for lens edging equipment.

Another object of this invention is to provide an attachment for eye glass bevel edging machines which eliminates the cam patterns presently used for sizing and shaping lenses to fit an eye glass frame.

A further object of this invention is to provide a servo mechanism having a plurality of sensors directly engaging and sensing the inside periphery of an eye glass frame for controlling the duplication of the lens edge in an eye glass lens edging machine.

A still further object of this invention is to eliminate the necessity of maintaining a large file of cam contours for cutting lenses.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing in which:

FIG. 1 is a partial view of a conventional eye glass frame and lens;

FIG. 2 is a view of a conventional eye glass lens;

FIG. 3 is a view of a conventional eye glass cam or cam pattern;

FIG. 4 is a perspective view of a lens edging machine having mounted on it a lens sensing apparatus for sensing the inside periphery of a lens holder and embodying the invention;

FIG. 7 is a front view of the structure shown in FIG. 5;

FIG. 8 is a back view of the structure shown in FIG. 7;

FIG. 9 is a cross sectional view of the structure shown in FIG. 7 taken along the axis of the center shaft;

FIG. 10 is an enlarged partial view illustrating the meridian slide locating device shown in FIGS. 5 and 9;

FIG. 11 is an enlarged partial view of the clutch engaging means; and

FIG. 12 illustrates an enlarged partial view of the cam slide plates or sensors shown in FIG. 6 illustrating its biasing means.

DESCRIPTION OF THE PREFERRED EMBODIMENT

Figure 5:
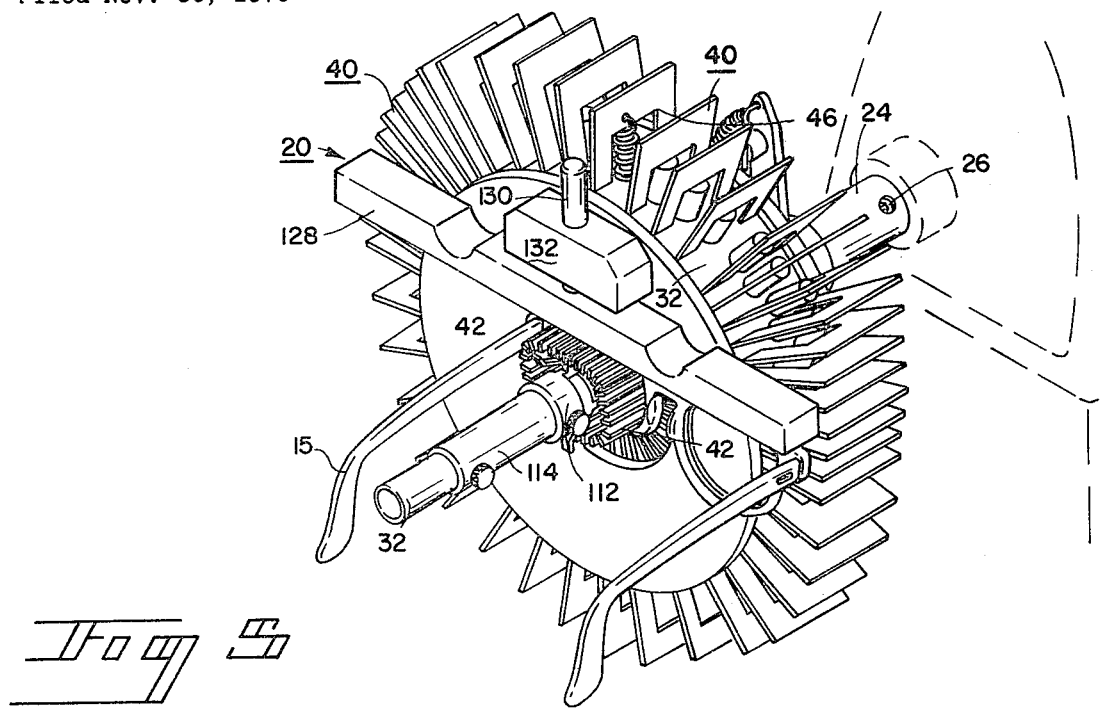
FIG. 5 is an enlarged perspective view of the lens sensing device shown in FIG. 4.

Referring more particularly to the drawings by characters of reference, FIG. 1 discloses a part of a pair of eye glasses 13 partially broken away wherein point A represents the axis of lens 14 mounted in frame 15, points B and C represents the vertical meridians and points D and E represent the horizontal meridians of the frame. The axis A, vertical meridian points B and C and horizontal meridian points D and E of the conventional eye glass lens 13 are shown in FIG. 2.

A typical cam or cam pattern F representative of such patterns used in the prior art for producing lens 14 is shown in FIG. 3.

FIG. 4 illustrates an eye glass lens grinder 16 mounted on a table 17. The grinder comprises a motor which drives a shaft to which is fixedly attached a grinding wheel for grinding the edges of a lens such as lens 14 which is mounted by suitable gripping or chucking means on shaft 18 all not shown in detail since they comprise parts of well known lens grinding machines of the prior art.

In accordance with the invention claimed a new glass lens edging apparatus 20 is mounted on shaft 18 of grinder 16 as shown in FIG. 4 for sensing the inside periphery of a lens holding frame such as but not limited to an eye glass frame. The glass lens edging apparatus comprises a central shaft 22 having a mounting collar 24 fixedly attached to it at one end for mounting on shaft 18 of grinder 16 and firmly held thereon by set screw 26 in mounting collar 24. An extension 28 of shaft 22 is held in axial alignment with shaft 22 by a bolt 30 threadedly connecting extension 28 to shaft 22 as shown in FIG. 9.

Concentrically disposed about the axis of shaft 22 and fixedly attached thereto is a radially fluted disk 32. Disk 32, as shown in FIG. 9, is keyed to shaft 22 by means of a conventional type key 34 fitting into a slot 36 in disk 32 and key slot 38 in shaft 22.

As shown in FIGS. 5, 7, 8 and 9 of the drawings a plurality of cam slide plates 40 are spacedly disposed in the radial flutes of disk 32 about the axis of shaft 22. Each cam slide plate 40 comprises a U-shaped member 41 provided with laterally extending arms 42 and 43 protruding outwardly from its leg members 44 and 45, respectively. Arms 42 and 43 of each cam slide plate 40 are axially aligned and parallelly arranged with the center of shaft 22 and at a given distance therefrom. Each cam plate 40 is identical in shape with the others except for two cam plates 46 arranged on the vertical meridians of disk 32 and two cam plates 48 arranged on the horizontal meridians of the disk. These four cam plates are also identical to one another.

As shown in FIG. 12 of the drawing, the cam slide plates 40 are each provided with spring biasing means 49 comprising a plunger or piston 50 biased in a radially direction outwardly from disk 32 by a spring 52 mounted to extend from the base of an aperture 53 in disk 32 radially outwardly toward slide cam plates 40. The free end of spring 52 is fitted into the hollow interior of piston 50 which is slidably mounted in aperture 53.

FIG. 9 illustrates how the meridian slide cam plates 46 and 48 are biased radially inwardly of disk 32. Each of these plates is biased inwardly toward the axis of shaft 22 by a spring 54 secured to the inner surface of the U-shaped member 41 forming the cam slide plates 46 and 48 and a spring retaining pin 56 arranged laterally across each aperture 53 formed in disk 32. Spring 54 maintain cam slide plates 46 and 48 in normal retracted positions.

The cam slide plates 40, 46 and 48 are held in given outward and inward extended positions by a cam slide retaining plate 58 solidly affixed to one radially extending side surface of disk 32 as shown in FIGS. 7 and 9, by means of screws 60 and a clutch plate 62 mounted in juxtapositioned axial arrangement with the other radial side surface of disk 32. To the inner face surface 64 of clutch plate 62 is affixed a clutch facing material 66 which is arranged to engage protrusions 68 provided along the length of the juxtapositioned legs of cam slide plates 40, 46 and 48. These protrusions are shown in FIG. 9 but let off of the other views for sake of simplicity.

Disk 32 is provided with a plurality of openings 70 which extend into said other radial side of disk 32 laterally of its side and perpendicular to the inner surface of clutch plate 62. These openings each house a clutch release means which comprises a plunger 72 slidably mounted within the opening 70 and biased outwardly by a spring 74 arranged between the base of opening 70 and plunger 62 to maintain pressure on the inner surface of the clutch facing material 66 and clutch plate 62.

The clutch plate 62 is forced into binding engagement with the legs of cam slide plates 40, 46 and 48 by a clutch engaging means 76, shown in FIGS. 7 and 11 by turning handles 78. Handles 78 have threaded shafts 82 which are threadedly arranged in threaded bores of holes 84 in clutch plate 62. By rotating handles 78 the clutch plate 62 and associated clutch face material 66 are drawn toward or moved away from disk 32 thereby locking or releasing cam slide plates 40, 46 and 48 to operate under the influence of their biasing means.

As best seen in FIG. 8 the glass lens edging apparatus 20 is provided with a loop type cam slide plate retaining spring 86 pivotally affixed at its extremities 88 and 90 to retaining spring actuating levers 92 and 94, respectively. Spring actuating levers 92 and 94 are axially disposed about shaft 22 on collars 96 and 98, respectively. Spring retaining levers 92 and 94 and their associated collars 96 and 98 are held in their linear positions by a collar 100 held in place on shaft 22 by suitable set screws. The spring retaining lever 94 is provided with a loop spring tensioning retaining means 102 comprised of a conventional coil spring 104 connected at one end to the end of lever 94 and at the other end to a catch 106.

It should be noted from FIGS. 8 and 9 of the drawing that cam slide plates 40 have their arms 43 near the surface of shaft 22 and are engaged by loop spring 86. Further, cam slide plates 46 and 48 each have a corresponding shortened arm 109 adjacent the same portion of shaft 22 as cam slide plates 40 which is not engaged or influenced by loop spring 86. Thus, all of the cam slide plates 40 are biased outwardly of disk 32 but may be maintained in their innermost radial position by loop spring 86 when levers 92 and 94 are angularly moved toward each other.

As heretofore described cam slide plates 46 and 48 are biased toward shaft 22 by springs 46. In order to keep these cam slide plates outwardly of shaft 22 against the biasing effects of springs 46, a meridian slide locating device 110 is provided. Slide locating device 110, shown in FIGS. 5, 9 and 10, comprises a pair of longitudinally movable concentrically mounted collars 112 and 114 slidably mounted on extension 28 of shaft 22. These collars have disposed at their inner extremities cam ramps 121 and 118, respectively. Located near the inner extremity of extension 28 is a collar 120 having pivotally mounted on it four slide engagement levers for engaging the vertical and horizontal cam slide plates 46 and 48, respectively. These levers are hereinafter called vertical meridian engagement levers 122 and horizontal meridian engagement levers 124. Collar 120 is provided with a set screw 126 to solidly lock collar 120 to extension shaft 28. Further, it will be seen from FIG. 9 that slide collars 112 and 114 are provided with guide pins 116 and 119 running in guide slots 123 and 125 of collar 114 and extension shaft 28, respectively. Collars 112 and 114 may be held in given positions inwardly of extension shaft 28 wherein the vertical and horizontal meridian engagement levers 122 and 124 are biased outward by tightening down on knurl nuts 113 and 115, respectively.

One of the useful purposes to which the disclosed attachment for lens grinders may be used is for grinding lens to fit any and all eye glass frames. Accordingly, FIGS. 5 and 7 show an eye glass frame horizontal positioning member 126 mounted on retainer plate 58 and comprises a flat bar 128 perpendicularly mounted to a shaft 130. Shaft 130 is slidably mounted in a bore of a guide block 132 which is attached to retainer plate 58. The horizontal positioning means 126 may be maintained in any one of a number of places by means of a thumb screw 134 threadedly mounted in guide block 132 and arranged to engage shaft 130.

OPERATION

In order to utilize the glass lens edging apparatus for grinding eye glasses it is mounted on the end of the rotatable shaft 18 of an eye glass lens grinder 16 by sliding mounting collar 24 over shaft 18 and tightening down on set screw 26.

The loop spring retainer levers 92 and 94 are then rotated toward each other thereby decreasing the diameter of the loop spring and drawing the plurality of cam slide plates 40 toward the axial center of the glass lens edging apparatus 20. The spring retaining catch 106 is then slipped over the free end of lever 92 to hold the levers 92 and 94 in close proximity to each other thereby maintaining spring tension on loop spring 86 which in turn maintains cam slide plates 40 in their retracted position adjacent shaft 22.

Any given eye glass frame such as frame 15 without lens is then mounted on the eye glass lens edging apparatus 20 by sliding the lens opening of frame 15 over the extension 28 of shaft 22, slide collars 112 and 114 to a position substantially concentric with the axis of shaft 22 and extension 28 over and encompassing the plurality of arms 42 of the cam slide plates 40.

To insure exact horizontal alignment of the axis of the lens opening of frame 15 with shaft 22, the flat bar 128 of the horizontal positioning means 126 is released by loosening thumb screw 134 causing shaft 130 connected to flat bar 128 to slide through guide block 132 causing flat bar 128 to rest directly on top of frame 15 as shown in FIG. 5.

Slide collar 114 and associated cam ramps 118 are then slid longitudinally along extension 28 engaging levers 122 causing them to bear against the lower surfaces of arms 42 of the vertical meridian cam slide plates 46 forcing them away from the axis of extension 28 into engagement with the inner rim of the lens opening of frame 15 at points B and C as shown in FIG. 1. Slide collar 112 and its cam ramps 121 are then slide longitudinally over slide collar 114 causing cam ramp 121 to engage levers 124 causing them to bear on the lower surfaces of arms 42 of the horizontal meridian cam slide plates 48. This action forces cam slide plates away from the axis of extension 28 causing them to bear against the inner rim or periphery of frame 15 at points D and E. With the meridian cam slide plates 46 and 48 located as described, the axial center of the lens opening in frame 15 has been concentrically located with reference to the axis of the glass lens edging apparatus 20. Thumb screw 134 of the positioning means 126 is now locked in place holding frame 15 against the retainer plate 58.

Figure 6:
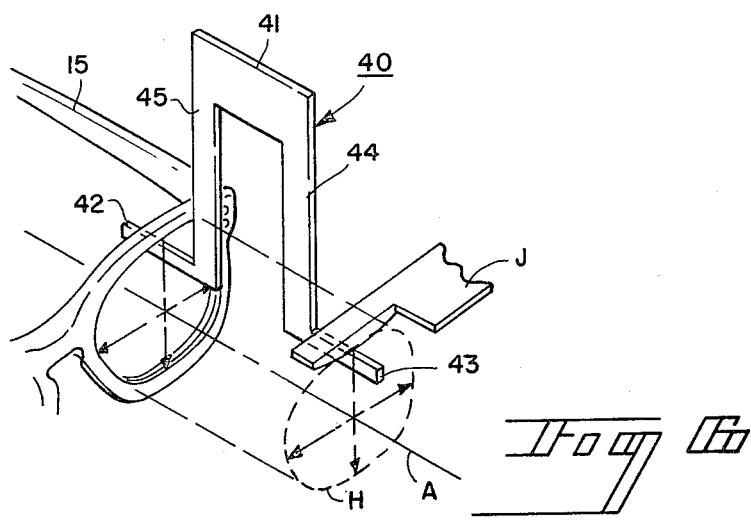
FIG. 6 is an enlarged perspective view of one of the sensors shown in FIG. 5 illustrating its operating position with relationship to a lens frame and a guiding mechanism of the lens edging machine shown in FIG. 4.

With the lens opening of eye glass frame 15 located concentrically about the axis of extension 28 of shaft 22 and the entire eye glass frame 15 arranged substantially horizontally to meridian cam slide plates 46 and 48, the plurality of cam slide plates 40 are released allowing their arms 42 to be brought to bear against the inner periphery of the lens opening of frame 15 as follows:

The spring retaining catch 106 is released from its position on spring biased lever 92 thereby releasing the tension of loop spring 86 on the arms 43 of the cam slide plates 40. The cam slide plates 40 then under the influence of the spring biased plungers 50 are actuated outwardly away from the axial center of glass lens edging apparatus 20 bringing arms 42 of the cam slide plates 40 to bear against the inner peripheral surface or edge of the lens opening of frame 15. As best seen in FIG. 6 of the drawing wherein a single cam slide plate 40 is shown for purposes of clarity, arm 42 is in engagement with the inner periphery surface or edge of lens opening of frame 15.

The opposite arm 43 of the cam slide plate 40 and all other similar arms of cam slide plates 40 now form a geometrical configuration of the periphery of the inside peripheral edge of the lens opening in frame 15. It should be recognized that arms 42 of the same cam slide plates also form a similar pattern or outline of the lens opening. Thus, by sensing the outline formed by all of the arms 42 or 43 of cam slide plates 40, 46 and 48 a duplication of the inside periphery of the lens opening in frame 15 may be obtained.

FIG. 6 illustrates a sensor or cam follower J of eye glass lens grinder 16 which is arranged to sense the upper surface of arms 43 of cam slide plates 40, 46 and 48. The cam follower J follows the geometrical configuration formed by arms 43 thereby tracing an exact duplication of the lens opening of frame 15 reproduced by arms 42 of these cam slide plates. Cam follower J upon rotation of shaft 22 and the glass lens apparatus 20 transfers this sensed information to the grinding head of the conventional eye glass lens grinder 16 in a well known manner causing an optical lens of precisely the same geometrical shape as the lens opening in frame 15 to be ground and fitted into the lens opening being sensed in frame 15.

It should be recognized that cam slide plates 40 may be equally or unequally spaced around the periphery of disk 32 so as to increase or decrease the number of arms 43 forming the image of the design sensed by arms 42. This is particularly important with design configurations requiring more cam slide plate arm surfaces to define the outline of the configuration being reproduced.

Since cam slide plates 40, 46 and 48 define at other positions on them a replica of the lens opening being sensed by arms 42 of these cam slide plates, sensing arms of a grinder may obtain useful information from other areas of the cam slide plates than arms 42 and 43 if so desired.

Although but one embodiment of the present invention has been illustrated and described, it will be apparent to those skilled in the art that various changes and modifications may be made therein without departing from the spirit of the invention or from the scope of the appended claims.

What is claimed is:
1. A lens edging apparatus comprising in combination:
a rotatable shaft,
a disc fixedly mounted on said shaft for rotation therewith,
a plurality of cam means spacedly arranged around and slidably mounted on said disc for movement radially thereof,
biasing means one for each of said cam means mounted between said disc and said cam means for biasing said cam means radially outwardly of said disc,
each of said cam means being provided with an arm extending laterally thereof in a common direction,
said arm of each of said cam means being movable radially of said disc upon radial movement of said cam means,
releasable means for biasing said cam means radially inwardly of the outer periphery of said disc,
clamping means mounted on said disc for holding a lens frame amound the ends of said arms when they are biased inwardly by said releasable means,
said releasable means upon being released causing each arm of said cam means to be biased outwardly until it is stopped by the inner periphery of the lens frame,
said cam means when said arms are retained by the lens frame defining a geometrical configuration which is a replica of the inner periphery of the lens frame for sensing by a lens forming machine.

2. The lens edging apparatus set forth in claim 1 wherein said cam means when said arms are retained by the lens frame defining a geometrical configuration which is a substantial duplication of the inner periphery of the lens frame.

3. The lens edging apparatus set forth in claim 1 wherein said disk is provided with a plurality of openings extending radially outwardly of the periphery of said disk and wherein said spring means are mounted one within each of said openings for biasing said cam means radially outwardly of said disk.

4. The lens edging apparatus set forth in claim 3 wherein each of said cam means comprises a flat U-shaped member having a pair of legs,
the legs of each of said cam means straddling a peripheral edge of said disk,
one of said legs of each of said U-shaped members having said arm extending outward laterally thereof.

5. The lens edging apparatus set forth in claim 4 in further combination with a second arm mounted on the other leg of each of said cam means for defining a second configuration which is a duplication of the first mentioned configuration for guiding the sensors of a grinding machine.

6. The lens edging apparatus set forth in claim 1 wherein said cam means are irregularly spaced around the periphery of said disk.

7. A lens edging apparatus comprising in combination:
a rotatable shaft,
a disk fixedly mounted on said shaft for rotation therewith,
a plurality of cam means spacedly arranged around and slidably mounted on said disk for movement radially thereof,
one of said cam means being mounted on each of the quadrants of said disk,
first spring means one for each of said cam means mounted on the quadrants of said disk and arranged between said disk and these cam means for biasing these cam means radially inwardly of said disk,
second spring means one for each of the remaining cam means mounted between said disk and said remaining cam means for biasing said remaining cam means radially outwardly of said disk,
each of said cam means being provided with an arm extending laterally thereof in the same direction and defining a cam surface, said cam surface being movable radially of said disk upon radial movement of said cam means, means mounted on said shaft and movable longitudinally thereof for biasing and holding said cam means mounted on the quadrants of said disk outwardly against their associated spring means, holding means for biasing said remaining cam means radially inwardly of the outer periphery of said disk and holding them in a predetermined position, clamping means mounted on said disk for holding a lens frame around the ends of said arm of all of said cam means when they are biased inwardly of the outer periphery of said disk, said means mounted on said shaft when movable axially of said shaft causing said cam means mounted on the quadrants of said disk to engage the inside periphery of the lens frame to align the lens frame on the apparatus, said holding means upon being sequentially released causing each arm of said remaining cam means to be biased outwardly until it is stopped by the inner periphery of the lens frame, the outer periphery of said arms then defining a substantial duplication of the inner periphery of the lens frame opening for sensing by a lens forming machine.

8. The lens edging apparatus set forth in claim 7 wherein said disk is provided with a plurality of openings extending radially outwardly of the periphery of said disk and wherein said first and second spring means are mounted one within each of said openings for biasing said cam means radially of said disk.

9. The lens edging apparatus set forth in claim 8 wherein each of said cam means comprises a flat U-shaped member having a pair of legs, the legs of said cam means straddling a peripheral edge of said disk, one of said legs of each of said U-shaped members having said arm extending laterally outwardly therefrom.

10. The lens edging apparatus set forth in claim 9 wherein said U-shaped members are each provided with a second arm extending laterally outwardly therefrom in the same direction, said second arm of each U-shaped member defining a second cam surface for guiding a sensing arm of a lens grinding machine when said arm of each cam means defines a duplication of the inner periphery of the lens frame.

11. The lens edging apparatus set forth in claim 10 wherein said remaining cam means are irregularly spaced around the periphery of said disk.

References Cited

UNITED STATES PATENTS

| | | | |
|---|---|---|---|
| 900,664 | 10/1908 | Clark | 51—101 LG |
| 2,671,295 | 3/1954 | Sharp et al. | 51—101 LG |
| 3,170,374 | 2/1965 | Clar | 51—101 LGX |
| 3,555,739 | 1/1971 | Novak | 51—101 LG |

LESTER M. SWINGLE, Primary Examiner